July 18, 1933.　　　　　　G. F. RACKETT　　　　　1,918,488

APPARATUS FOR PROJECTING MOTION PICTURES

Filed Sept. 23, 1929

Inventor
Gerald F. Rackett
By Lyon & Lyon
Attorneys

Patented July 18, 1933

1,918,488

UNITED STATES PATENT OFFICE

GERALD F. RACKETT, OF LOS ANGELES, CALIFORNIA, ASSIGNOR TO ASSOCIATION OF MOTION PICTURE PRODUCERS, INC., OF LOS ANGELES, CALIFORNIA, A CORPORATION OF CALIFORNIA

APPARATUS FOR PROJECTING MOTION PICTURES

Application filed September 23, 1929. Serial No. 394,466.

This invention relates to an apparatus whereby picture areas placed on a motion picture film eccentrically with respect to the optical axis of the projection machine may be projected without changing the direction of the optical axis of a projection lens and place the projected images centrically with said optical axis.

The invention also relates to a device adapted to be used in conjunction with a projecting machine so as to act upon light or images projected by said projector to proportionally extend or magnify said images in one direction only, while maintaining one edge of the image in a stationary fixed position.

In general, the object of this invention is to provide a means for projecting motion picture films carrying picture areas or images placed eccentrically on said films or with respect to the optical axis so that the image when projected upon a screen is placed centrally thereon, the center of said projected image being coincidental with the optical axis of the projector and not with the center line of the image as carried by the film.

Another object is to provide a means which may be readily adjusted to project images as above described and also to project centrically positioned film images without shifting the projection lens.

Another object is to disclose and provide a device simple in construction and in operation for accomplishing the result defined hereinabove.

Other objects, uses and advantages of this invention will become apparent from the following detailed description.

In describing the invention, reference will be had to the appended drawing, in which.

Figure 3:
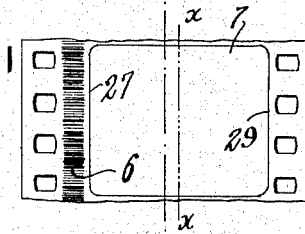
Fig. 3 illustrates a portion of a motion picture film having an eccentrically placed picture area thereon.
Figure 4:
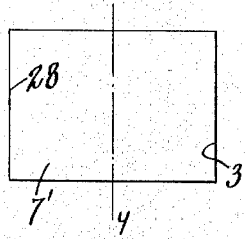

Fig. 4 merely illustrates the proportions of the projected image which it is desired to obtain by projecting the picture area shown in Fig. 3.

Figure 5:
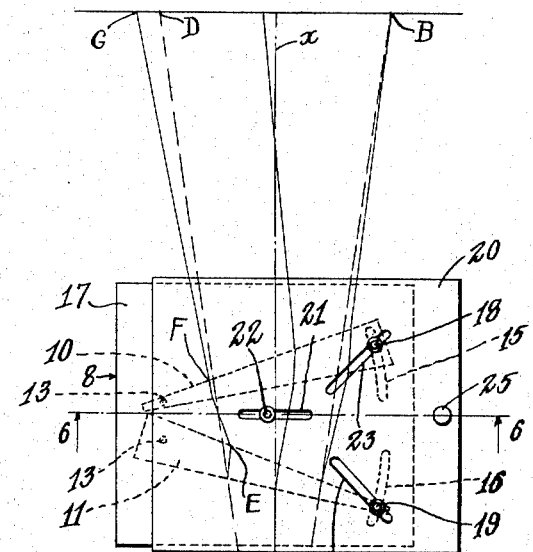

Fig. 5 is a plan view of the device embraced by this invention.

Figure 6:
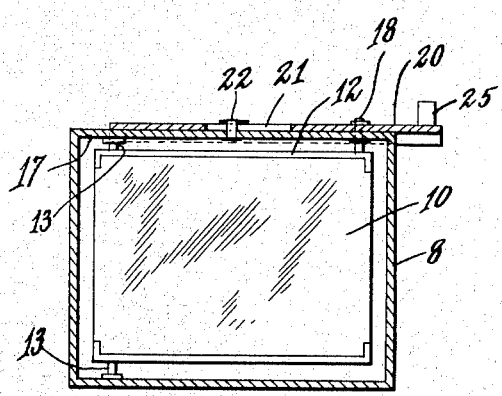

Fig. 6 is a vertical section taken through the device illustrated in Fig. 5, along line 6—6 thereof.

Normally, projection machines such as the machine 1 are permanently positioned in projection booths of theatres so that the optical axis of the projection lens 2 coincides with or is directed toward the vertical center line of the screen upon which the picture is to be projected. The screens are, therefore, fixed and have the proportions of the picture area 3 of a normal motion picture film 4.

Continuous motion picture films are now being produced in large quantities bearing thereon a sound track or sound record which is to be reproduced simultaneously with the projection of the picture areas. The total width of the picture film is not changed.

In Fig. 3 the continuous film 5 bears thereon a sound record 6 which necessarily reduces the width of the picture area 7. The vertical center line $x$—$x$ of the picture area 7 is, therefore, horizontally off-set from the optical axis $Y$—$Y$ of the projection machine or projection lens 2. When the picture area 7 is projected in a normal projection machine, the projected image does not cover the entire width of the screen, but instead occupies an off-center position. Furthermore, the decreased width is quite noticeable and gives the impression of viewing the images on a small screen.

As has been stated before, an object of this invention is to project eccentrically placed images, such as the image 7, upon a standard screen or a screen having a vertical center line coincidental with the optical axis of the projection lens, without moving the projector or the projector lens so that the projected image 7' occupies the entire area of the screen and is of proportionately greater width than the image 7 carried by the film.

Means whereby this method and effect may be carried out and produced comprise a plurality of wedge-like small angle prisms pivotally mounted in a suitable housing, said prisms being adapted to successively act upon light passing through the projector and optically magnify the image in one dimension while maintaining one edge of said dimension stationary and without altering the other dimension of said image so as to cause the image carried by the picture area to cover the entire screen.

Figure 1:
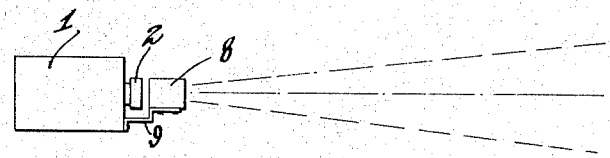
Fig. 1 is a diagrammatic side elevation representing the relative positions of a projecting machine and the device embraced by this invention.
Figure 2:
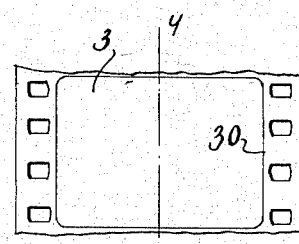
Fig. 2 represents the normal picture area on a film.

The device is preferably mounted in front of the projection lens 2, as shown in Fig. 1, and comprises a housing 8 mounted upon a suitable bracket 9 attached to the projector or in fixed relation with said projector. Within the housing 8 two opposed wedge-like prisms 10 and 11 are pivotally mounted.

Said prisms are preferably provided with plane surfaces inclined at an angle of about 10 degrees, although it is to be understood that prisms at angles of from 5 to about 15 degrees may be employed.

Preferably, the prisms 10 and 11 are mounted within frames 12 made of metal or any other suitable material, said frames 12 being provided with pins 13 pivotally mounted in suitable bearings carried by the housing 8. As shown in Fig. 5, light from the projector passes through the prisms 11 and 10 successively.

Arcuate grooves 15 and 16 are preferably provided in the top 17 of the housing 8, said arcuate grooves 15 and 16 being adapted to receive pins 18 and 19, respectively, carried by the prisms 10 and 11 near ends thereof opposed to the pivoted ends.

Means for adjustably positioning the prisms 10 and 11 relatively to each other so as to increase or decrease their angular relation may be provided. A simple form of means for this purpose may comprise a slidable upper plate 20 provided with a slot 21 adapted to receive a pin 22 rigidly attached to the top 17 of the housing 8, said pin 22 being positioned substantially in the center and between said prisms 10 and 11. The upper plate 20 may also be provided with inclined slots 23 and 24, said slots being adapted to receive the pins 18 and 19 protruding through the arcuate openings 15 and 16 formed in the upper portion 17 of the housing 8.

Any suitable handle such as the handle 25 may be attached to the adjusting member 20 so as to move said member transversely to the optical axis extending through the device. Such transverse motion when imparted to the member 20 will be seen to cause the prisms 10 and 11 to pivot upon their pins 13 and 14 simultaneously, thereby changing the angular relation between said prisms.

In Fig. 5 the optical axis of the projection lens is indicated at Y—Y. Said optical axis Y—Y when extended will coincide with the vertical center line of the screen as the projection lens and projection machine is disposed symmetrically with respect to said screen.

The picture transparency or film 5 bearing the picture frame or transparency 7 thereon and the sound record 6 when projected through said lens, normally will permit the edge 29 to coincide with the boundary of the screen. The edge 27, however, would normally fall within the left hand boundary of the screen, inasmuch as the vertical center line of the image being projected, said center line being indicated at x—x, is horizontally displaced with respect to the optical axis. Normally, therefore, the boundary line obtained by normal projection of the picture transparency 7 may be indicated by the lines A—B and C—D. The image on the screen is, therefore, eccentrically positioned with respect to the optical axis Y—Y and not symmetrically disposed on the screen.

When such image is projected through the device described hereinabove, however, it will be seen that the prism 11 will divert the ray C—D, as indicated at E, and the prism 10 will correct the ray C—E as indicated at F, so that the ray will reach the screen as the ray C—E—F—G. It will be noticed that the ray C—D has been displaced or extended toward the left a distance substantially proportionately equivalent to the space occupied by the sound record 6. It is also to be noted that the boundary 27 now occupies a position on the screen symmetrical with respect to the axis Y—Y in comparison with the position of the boundary 29 projected on the screen.

The prisms 11 and 10 divert the rays A—B somewhat, but such diversion does not change the position of the boundary 29 on the screen. The picture transparency 7, although eccentrically positioned with respect to the optical axis is thus projected so as to form an image on the screen which is centrical with respect to the optical axis and which covers the entire screen.

The magnification of the picture transparency is thus seen to be accomplished in one direction only, namely, the horizontal, without moving or shifting the position of the boundary 29 upon the screen. The enlargement of the image is proportional throughout its width and not localized at merely the left hand edge or section of the projected image on the screen. The vertical center line of the picture transparency 7, namely, the vertical center line x—x is thus made to coincide with the optical axis Y—Y upon the screen.

After the device described hereinabove has been adjusted so as to project picture transparencies eccentrically positioned with respect to the optical axis, and it is then desired to project a picture transparency which is symmetrical with respect to the optical axis, it is only necessary to bring the prisms 10 and 11 so that their axes are substantially normal to the optical axis. Symmetrically disposed picture transparencies, such as for example, the picture area 3 on the film 4 may then be projected in the normal manner through the prisms 10 and 11, said prisms effecting the minor change in the path of the rays without changing the location or size of the image upon the screen.

It will thus be seen that the device may be readily used without shifting the projector machine or the projection lens, either on picture transparencies symmetrically disposed with respect to the optical axis or eccentrically disposed with respect to said axis.

Although a particular form of device has been described in considerable detail, numerous changes and modifications may be made without departing from the invention. The precise position of the prisms with respect to the optical axis and the angularity of said prisms is influenced, of course, by the character of the material from which they are constructed and the size and location of the transparency which it is desired to project.

I claim:

1. The combination of a projector and a screen, the optical axis of the projector being directed at the vertical center line of the screen and a device positioned between the projector and said screen, said device comprising a pair of wedge-like opposed prisms adapted to successively act upon images eccentrically disposed with respect to the optical axis and projected by said projector, said prisms being adapted to cause said eccentrically disposed image to assume a centric position on the screen, both of said prisms being pivotally mounted on vertical axes on one side of said optical axis.

2. A device comprising, in combination with a projector, a pair of opposed wedge-like prisms positioned in spaced relation in the optical axis of the projector and adapted to successively act upon images eccentrically disposed with respect to the optical axis and projected by said projector, both of said prisms being pivotally mounted on vertical axes on one side of said optical axis, and means for adjustably and angularly positioning said prisms relative to each other and to said optical axis.

3. The combination of a projector and a screen, the optical axis of the projector being directed at the vertical center line of the screen and a device positioned between the projector and said screen, said device comprising a pair of wedge-like opposed prisms positioned in spaced relation between the projector and said screen, said prisms being adapted to successively act upon images eccentrically disposed with respect to the optical axis and projected by said projector, said prisms being adapted to cause said eccentrically disposed images to assume a centric position on the screen by optically expanding the image in a horizontal direction only without shifting one vertical boundary of said image, both of said prisms being pivotally mounted on vertical axes on one side of said optical axis, and means for adjustably and angularly positioning said prisms relatively to each other and to said optical axis.

4. The combination comprising a lens, a pair of small light refracting prisms positioned in operative relation with the lens, the prisms being normally positioned at an angle to one another with the apex of the acute angle of one prism being positioned adjacent a base angle of the other prism, pivotal means mounting the adjacent ends of the prisms and means for moving the prisms about their pivots to increase or decrease the angle between the prisms.

GERALD F. RACKETT.